2,973,368

3-AZABICYCLO [3:2:0] HEPTANE AND DERIVATIVES THEREOF

Leonard M. Rice, Baltimore, Md., and Charles H. Grogan, Falls Church, Va., assignors to The Geschickter Fund for Medical Research Inc., Washington, D.C., a corporation of New York No Drawing. Filed Jan. 28, 1957, Ser. No. 636,512

10 Claims. (Cl. 260—313)

This invention relates to compositions of matter, particularly organic and pharmaceutical intermediates and their methods of preparation, and more particularly to compounds having value as surface active agents and antioxidants.

Specifically this invention relates to 3-azabicyclo [3:2:0] heptane, and N-substituted derivatives thereof, the bases themselves and their acid addition and quaternary salts.

An object of this invention is to provide novel organic compounds and methods for their preparation.

Another object of this invention is to provide novel organic compounds that are valuable synthetic intermediates in the synthesis of new organic compounds and pharmaceuticals disclosed in co-pending application No. 539,652 filed October 10, 1955, now Patent No. 2,802,003. In addition, the bases and their acid addition salts possess, in varying degree, antioxidant action in fuels, lubricating oils and plastics while some of the quaternary salts are surface active agents useful as detergents.

These and other objects and the manner in which they are accomplished will become apparent to those conversant with the art from the following description of the general class of compounds and the several specific examples and methods of obtaining them presented.

The novel bicyclic bases discovered are obtained by reduction of the N substituted imides of cis-1,2-cyclobutane dicarboxylic acid (N substituted-3-azabicyclo [3:2:0] heptane-2,4-diones). The bases thus obtained are converted by suitable means into acid addition and quaternary salts.

Formula I shows the general structural formula of the bicyclic bases herein disclosed.

FORMULA I

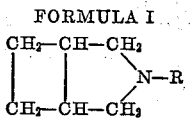

Formula II depicts the general structure of the acid addition salts formed from these bases; and Formula III the structure of the quaternary salts formed from the bicyclic bases.

FORMUAL II

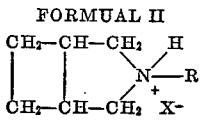

FORMULA III

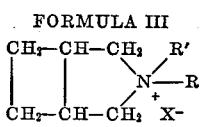

In Formulae I, II and III, R is hydrogen or is an alkyl group containing from 1 to 18 carbon atoms. R' is also an alkyl group containing from 1 to 18 carbon atoms. In the quaternary salts, Formula III, R and R' may be the same radical or different radicals within the foregoing definitions. In addition, R may represent a carbon chain containing an unsaturated linkage having from 2 to 18 carbon atoms, including alkenyl radicals such as the allyl radical. Further, R' may represent a carbon chain containing an unsaturated linkage having from 3 to 18 carbon atoms, including alkenyl radicals such as the allyl radical. X represents an anion such as chloride, bromide, iodide, acetate, sulfate, hydrogen sulfate, methyl sulfate, tolulene sulfate, mucate or theophyllinate.

The imides used as starting materials in forming the compounds of the invention are prepared, as outlined in our co-pending application, Serial No. 636,461, filed on even date herewith, by reacting the appropriate aliphatic amine or ammonia with the anhydride of 1,2-cis-cyclobutane dicarboxylic acid.

The following specific examples of compounds and methods will illustrate the manner in which the general synthesizing procedure may be applied to obtain particular members of the class of compounds discovered. The following specific examples are merely illustrative and are not, nor are they intended to be, exhaustive of all the compounds embraced by the present invention.

EXAMPLE I

*N-methyl-3-azabicyclo [3:2:0] heptane*

Into a 2-liter 3 necked flash fitted with a stirrer, condenser and a dropping funnel was placed 17 gm. of lithium aluminum hydride and 1000 ml. of anhydrous ether. After solution had been effected, a solution of 32.0 gm. of the N-methyl imide of 1,2 cyclobutane dicarboxylic acid in anhydrous ether was added dropwise with stirring. The rate of addition was adjusted so as to just maintain reflux. The mixture was allowed to stand for 4 hours and then decomposed with water. After sufficient water had been added, the mixture was stirred an additional hour. The inorganic matter was removed by filtration and washed with ether. The filtrate was dried over anhydrous sodium sulfate, stripped of ether and fractionated. The product boiled at 123–127° C., $n_D^{20}=1.4583$ and weighed 18 gm.

| Analysis | Percent Carbon | Percent Hydrogen | Percent Nitrogen |
|---|---|---|---|
| Calculated | 75.61 | 11.79 | 12.60 |
| Found | 75.76 | 11.69 | 12.58 |

*a.* The hydrochloride was prepared by means of alcoholic hydrogen chloride and ether, M.P. 166–169° C. After recrystallization from isopropanol ether the product melted at 167–168° C. Calculated ionic chloride 24.01%. Found ionic chloride 24.19%.

*b.* The methiodide salt was prepared by adding a slight excess of methyl iodide to an acetone solution of the base. This after recrystallization from isopropanol melted at 197–197.5° C. Calculated ionic iodine 50.14%. Found ionic iodine 50.20%.

*c.* The decyl quaternary salt was prepared in a like manner using ether as a solvent and decyl iodide and melted at 146–147° C. Calculated ionic iodine 33.45%. Found ionic iodine 33.57%.

EXAMPLE II

*N-butyl-3-azabicyclo [3:2:0] heptane*

This base was prepared from 18 gm. of the N-butyl imide in a manner analogous to the methyl homolog.

It had a boiling point of 112–115° C. at 75 mm., $n_D^{20}=1.4599$, and weighed 12.5 gm.

| Analysis | Percent Carbon | Percent Hydrogen | Percent Nitrogen |
|---|---|---|---|
| Calculated | 78.34 | 12.50 | 9.14 |
| Found | 78.38 | 12.54 | 9.39 |

The hydrochloride made as in Example I(a) melted at 205–209° C. After recrystallization from isopropanol ether the product melted at 208–209° C. Calculated ionic chloride 18.69%. Found ionic chloride 18.85%.

The methiodide made as in Example I(b) melted at 175–177° C. After recrystallization the product melted at 189–190° C. Calculated ionic iodine 42.99%. Found ionic iodine 43.04%.

EXAMPLE III

*N-hexyl-3-azabicyclo [3:2:0] heptane*

The base was prepared in a manner analogous to Example I employing 25 gm. of the hexyl imide and 12 gm. of lithium aluminum hydride. Seventeen grams of product were obtained boiling at 100–105 at 15 mm. and $n_D^{20}=1.4672$.

| Analysis | Percent Carbon | Percent Hydrogen | Percent Nitrogen |
|---|---|---|---|
| Calculated | 79.49 | 12.78 | 7.73 |
| Found | 79.70 | 12.74 | 7.78 |

The hydrochloride salt made as in Example I(a) melted at 165–169° C. and recrystallization from ethyl acetate ether raised the melting point to 170–171.5° C. Calculated ionic chloride 16.28%. Found ionic chloride 16.31%.

The methiodide made as in Example I(b), employing acetone ether as a solvent medium melted at 101–102° C. Calculated ionic iodine 39.39%. Found ionic iodine 39.26%.

EXAMPLE IV

*N-decyl-3-azabicyclo [3:2:0] heptane*

The N-decyl base when prepared in a manner analogous to Example I, employing 18.7 gm. of the imide, yielded 13 gm. of the title compound with a boiling point of 117–125° C. at 2 mm. and $n_D^{20}=1.4648$.

| Analysis | Percent Carbon | Percent Hydrogen | Percent Nitrogen |
|---|---|---|---|
| Calculated | 80.94 | 13.16 | 5.90 |
| Found | 80.94 | 13.10 | 6.15 |

The hydrochloride made as in Example I(a) and recrystallized from ethyl acetate melted at 161–162° C. Calculated ionic chlorine 12.95%. Found ionic chlorine 13.10%.

The methiodide prepared as in Example I(c) yielded the product which after recrystallization from ethyl acetate ether melted at 146–147° C. Calculated ionic iodine 33.45%. Found ionic iodine 33.63%.

From the foregoing description of a novel class of compounds, and detailed preparatory methods for exemplary members of the class, it will be understood that, on the basis of the discovery and knowledge disclosed herein, other specific compounds can be made and variations in the methods of synthesis resorted to. The exemplary compounds prepared serve to illustrate the comprehensive nature of the method in that a wide variety of primary amines can be employed as starting materials and the corresponding imides obtained.

The compounds according to Formulae I, II, and III wherein R is one of the remaining alkyl radicals having from 1 to 18 carbon atoms may be prepared by procedures similar to those disclosed in the preceding examples, by reducing the appropriate imide with lithium aluminum hydride to yield the base which may be thereafter converted to the acid addition salts and quaternary salts.

Also, the compounds according to Formulae I, II and III wherein R is an alkenyl radical having from 2 to 18 carbon atoms may be prepared according to procedures similar to those disclosed in the preceding examples, by reducing the appropriate imide, such as N-allyl-3-azabicyclo [3:2:0] heptane-2,4-dione, with lithium aluminum hydride to yield the base which may be thereafter converted to the acid addition salts and quaternary salts.

The compounds according to Formulae I, II and III wherein R is a hydrogen atom may also be prepared by procedures similar to those outlined in the preceding examples, by reducing 3-azabicyclo [3:3:0] heptane-2,4-dione with lithium aluminum hydride to yield 3-azabicyclo [3:2:0] heptane, which may be converted to the acid addition and quaternary salts.

While the preparation of the hydrochloride acid addition salt has been illustrated in the examples, other acid addition salts such as the hydrobromide, hydroiodide, acetate, sulfate, mucate and theophyllinate may be prepared in a manner similar to the illustrated preparation of the hydrochloride.

Similarly, while the preparation of the methiodide quaternary salt have been illustrated in the examples, other quaternary salts such as the methochloride, methobromide, dimetho-sulfate, metho-hydrogen sulfate, and metho-toluene sulfate may be prepared in a manner similar to the illustrated preparation of the methiodide.

To form the quaternary salts where the anion is acetate, mucate, theophyllinate or other weak acid anions, the quaternary halide may be first formed and then treated with silver oxide or an ion exchange resin to remove the halide. The free quaternary base hydroxide is next neutralized with the appropriate weak acid such as acetic, mucic, theophyllin, etc.

The compounds of the invention are useful in preparing certain diquaternary salts having chemotherapeutic hypotensive activity disclosed and claimed in our copending application, Serial No. 539,652, filed October 10, 1955, now Patent No. 2,802,003, having the formula:

FORMULA IV

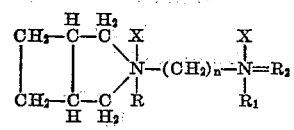

wherein $n$ is a whole number from 1 to 6, R and $R_1$ are alkyl groups each having from 1 to 6 carbon atoms; $R_2$ represents two alkyl groups each having from 1 to 6 carbon atoms, or ($N=R_2$) represents one of the heterocyclic rings morpholine, piperidine, pyrrolidine, piperazine or N-methyl piperazine; and X is an anion such as chloride, iodide or bromide.

These diquaternary salts may be prepared by reacting a base of Formula I with an α-quaternary ammonium halide-ω-halogeno alkane according to the equation:

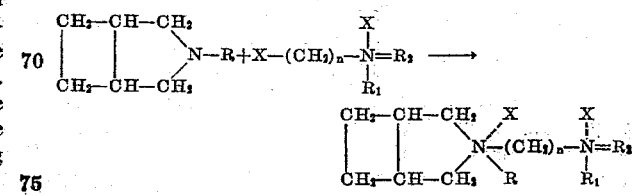

By way of example, N-methyl-azabicyclo 3:2:0 heptane and

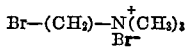

were mixed in equimolecular proportions in alcohol, the mixture refluxed for several hours, cooled, and the product precipitated with ether. A 90% yield of the dimethobromide salt of N-dimethylaminoethyl-3-azabicycloheptane 3:2:0 was obtained.

The compound of the invention according to Formula I wherein R=H, 3-azabicyclo [3:2:0] heptane, is useful as an intermediate in preparing the bases disclosed and claimed in our copending application Serial No. 539,652, filed October 10, 1955, now Patent No. 2,802,003, having the formula:

FORMULA V

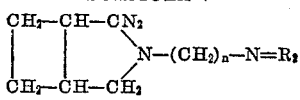

wherein $n$ and $R_2$ have the same meanings as in Formula IV.

The bases of Formula V may be obtained by reacting 3-azabicyclo 3:2:0 heptane with a compound having the formula Halogen $(CH_2)_n-N=R_2$, according to the equation.

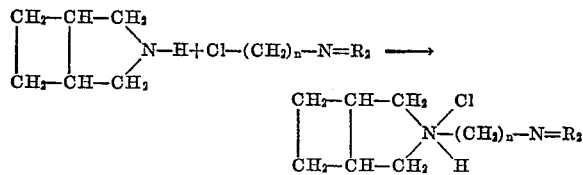

Additional of caustic to the above hydrochloride salt effects neutralization to yield the bases of Formula V.

Therefore, the specific compounds and methods disclosed herein are to be considered in all respects as illustrative and not restrictive, the scope of the discovery being indicated by the appended claims rather than the foregoing descriptive detailed examples, and all specific compounds and variations and methods which come within the meaning and range of equivalency of the claims are intended to be embraced therein.

What is claimed and desired to be secured by United States Letters Patent is:

1. A non-toxic methonium salt of N-methyl-3-azabicyclo [3:2:0] heptane.
2. A non-toxic methonium salt of N-butyl-3-azabicyclo [3:2:0] heptane.
3. A non-toxic methonium salt of N-hexyl-3-azabicyclo [3:2:0] heptane.
4. A non-toxic methonium salt of N-decyl-3-azabicyclo [3:2:0] heptane.

5. A composition of matter having the formula:

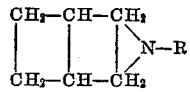

wherein R is alkyl of 1-18 carbon atoms.

6. A composition of matter having the formula:

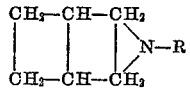

wherein R is alkenyl of 2-18 carbon atoms.

7. The non-toxic acid addition salts of the composition of claim 5.
8. The non-toxic acid addition salts of the composition of claim 6.
9. The non-toxic quaternary salts of the composition of the formula

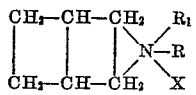

where X is a non-toxic anion; R is alkyl of 1-18 carbon atoms; and $R_1$ is selected from the group consisting of alkyl of 1-18 carbon atoms and alkenyl of 3-18 carbon atoms.

10. The non-toxic quaternary salts of the composition of the formula

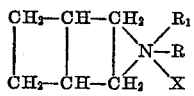

where X is a non-toxic anion; R is alkenyl of 2-18 carbon atoms; and $R_1$ is selected from the group consisting of alkyl of 1-18 carbon atoms and alkenyl of 3-18 carbon atoms.

References Cited in the file of this patent

UNITED STATES PATENTS

| | | |
|---|---|---|
| 2,541,211 | Cusic et al. | Feb. 13, 1951 |
| 2,743,270 | Blicke | Apr. 24, 1956 |
| 2,745,836 | Suter | May 15, 1956 |
| 2,784,199 | Grogan et al. | Mar. 5, 1957 |
| 2,786,834 | Rice et al. | Mar. 26, 1957 |

FOREIGN PATENTS

| | | |
|---|---|---|
| 1,108,117 | France | Aug. 24, 1955 |

OTHER REFERENCES

C. A., Decennial Index, vols. 31–40, 1937–1946, Subject Index A–Coposil, page 4101.

Chemical Abstracts, vol. 43 (1949), p. 10144, column 2.

Minard et al.: J. Am. Chem. Soc., vol. 7, pp. 1160–1161 (1949).